United States Patent [19]
Miyazono et al.

[11] Patent Number: 4,833,208
[45] Date of Patent: May 23, 1989

[54] COMPOSITE ACRYLIC RESIN PARTICLES

[75] Inventors: Tadafumi Miyazono; Akio Kashihara, both of Osaka; Shinichi Ishikura, Kyoto, all of Japan

[73] Assignee: Nippon Paint Co., Ltd., Osaka, Japan

[21] Appl. No.: 40,476

[22] Filed: Apr. 20, 1987

[51] Int. Cl.$^4$ .................. C08F 267/04; C08F 269/00
[52] U.S. Cl. .................................. 525/285; 525/286; 525/288; 525/292; 525/293; 525/295; 525/304; 525/305
[58] Field of Search ............... 525/286, 285, 292, 293, 525/295, 304, 305, 288

[56] References Cited

U.S. PATENT DOCUMENTS 3,787,522  1/1974  Dicke et al. ...................... 525/286
4,129,608  12/1978  Murayama et al. ............... 525/286

Primary Examiner—Jacob Ziegler
Attorney, Agent, or Firm—Wenderoth, Lind & Ponack

[57] ABSTRACT

Composite acrylic resin particles prepared by effecting an emulsion polymerization of a monomer mixture of
(A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds,
(B) at least one mono-functional polymerizable monomer other than an aromatic compound, and
(C) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, and graft-polymerizing thus obtained particles with a polymerizable aromatic compound and other optional mono-functional monomers.

The present acrylic resin particles are characterized in that a number of substantially linear acrylic polymer chains are chemically bonded to the particulate crosslinked acrylic polymer.

7 Claims, No Drawings

COMPOSITE ACRYLIC RESIN PARTICLES

FIELD OF THE INVENTION

The present invention relates to novel composite acrylic resin particles each comprising a particulate crosslinked acrylic polymer to which a number of substantially linear acrylic polymer chains are chemically bonded, and being specifically useful in coating compositions.

BACKGROUND OF THE INVENTION

Granular resins are supplied in the forms of emulsions, microgels, non-aqueous dispersion resins (NAD resins), powder resins and the like, and have been watched with keen interest in paint industries, especially in aqueous paints, high solid paints and powder paints, because of measuring up to the social requirements of economization of natural resources, energy saving and conservation of good surroundings.

However, such a resin is usually crosslinked so that the characteristics of the resin particles can be fully developed, and therefore when the granular resin is used alone, it is unable to yield a uniform or excellent film and the resulted film has a serious drawback of deficient film appearance.

Even when the granular resin is combined with a soluble type resin, there is a case that the viscosity of the mixture is unduly increased, as compared with that of said soluble type resin alone, due to the considerable interaction between the surfaces of said granules and the soluble type resin. Therefore, great care is often required in the actual use of such combination of resins.

Furthermore, since the characteristics of crosslinked resins are greatly influenced by the nature of surfactant used, crosslinking degree and combination of constituting monomers and the like, heretofore proposed crosslinked resin particles are hardly dispersible in such medium as aliphatic hydrocarbons, high boiling aromatic hydrocarbons, high polar solvents or the like,, and once they form agglomerates, hardly get loose back to the primary particles. Thus, considerable difficulties are always encountered in the actual application thereof.

It has also been well known to conduct the polymerization of acrylic monomers in multi-stages, thereby obtaining composite acrylic resin particles each having the so-called core-shell structure, the core being composed of crosslinked acrylic polymer and the shell being of crosslinked or non-crosslinked acrylic polymer. !;hen the shell portion is composed of non-crosslinked polymer, a comparatively good dispersion may be obtained with these particles in a soluble type resin or a solvent type coating composition. However, for a better ageing stability, the shell portion should preferably be chemically bonded to the crosslinked core resin, otherwise the non-crosslinked polymer in the shell portion will be gradually dissolved in said resin or organic solvent and the dispersion stability of the resin particles will be lost in time.

Under the circumstances, attempts have been made to effect graft polymerization in multi-stages, thereby chemically bonding the core and the shell layers, as for example, in Kamata et al. U.S. Pat. No. 4,362,845, Linder U.S. Pat. No. 4,393,172 and the like.

However, when the heretofore proposed composite resin particles were examined by dispersing them in butyl acetate, treating in a centrifugal machine to dissolve the non-crosslinked polymer into the solvent and measuring the remained particle weight, it was found that the grafting rate was generally of an extremely lower order. And, in fact, the dispersion stability of such resin particles in an organic solvent or resinous varnish was found to be rather poor.

It is, therefore, an object of the present invention to provide novel composite acrylic resin particles each comprising a particulate crosslinked acrylic polymer to which a number of substantially linear acrylic polymer chains are chemically bonded in a high grafting rate, which are free from the drawbacks possessed by the heretofore proposed composite resin particles.

An additional object of the invention is to provide novel composite acrylic resin particles which can be used either singularly or in combination form with other soluble resins customarily used in paint industries, to give excellent coating compositions with good aplication characteristics, and storage stability and capable of resulting in a uniform coating with excellent film appearance. Polymerization speed of an allyl compound, e.g. allyl acetate, is very low and its polymerization degree is likewise low. This is believed to be due to the occurrence of the so-called degradative chain transfer:

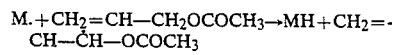

and the formation of resonance stabilized allyl radical of the formula:

which is less reactive and hardly enters into a reaction with an acrylic monomer. See, R. C. Laible, Chem. Revs. 58 (1958) 807; Encyclopedia of Polymer Science and Engineering, vol 4, p. 779.

Therefore, in the preparation of the core portion of crosslinked acrylic polymer, when such polyfunctional monomer as conjugated diene is used as a crosslinking agent, it would be most probable that none of the double bonds which can be the initiation points of the subsequent graft polymerization can remain on the surface of the formed polymer particle, or even if they remain to some extent, they are stabilized by the aforesaid degradative chain transfer and cannot be used as active sites for the subsequent graft polymerization.

The inventors, after diligent studying on a way for chemically bonding linear polymer chains to the surface of particulate crosslinked acrylic polymer, have succeeded in attaining said objects by utilizing the selective addition of particular substituted ethylenic bonds and particular polymerizable monomers, and have arrived at the invention. Thus, according to the invention, the aforesaid objects of the invention can be attained with novel composite acrylic resin particles each comprising a particulate crosslinked acrylic polymer to which a number of substantially linear acrylic polymer chains are chemically bonded, prepared by a combination of steps of effecting an emulsion polymerization of a monomer mixture of (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than an aromatic compound, and (C) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, to obtain an emulsion of crosslinked polymer particles on which radically polymerizable 1,2-di-, 1,1,2-tri- or 1,1,2,2-tetra-substituted ethylenic unsaturation bonds still remain, and effecting a graft-polymerization of said polymer particles with a polymerizable aromatic compound together with other optional mono-functional polymerizable monomers. The linear polymer chain may be somewhat branched or crosslinked as desired. Therefore, in the specification and claims, the term "substantially linear" shall mean the polymer chains which are essentially of linear type polymer, admitting the presence of a degree of branching or crosslinking therein.

The present composite acrylic resin particles are advantageously prepared by the following two steps.

1. Preparation of core portion of crosslinked acrylic polymer:

In this step, the following monomer mixture is polymerized in a conventional emulsion polymerization means i.e., (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds, (B) at least one mono-functional polymerizable monomer other than an aromatic compound, and (C) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds.

Examples of crosslinking monomer having in its molecule two or more radically polymerizable mono- or 1,1-di-substituted ethylenic unsaturation bonds are polymerizable unsaturated monocarboxylic acid esters of polyhydric alcohols, polymerizable unsaturated alcohol esters of polycarboxylic acids and aromatic compounds substituted with two or more vinyl groups.

More specifically, they are, for example, ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol alloxy dimethacrylate, 1,1,1-trishydroxymethylethane diacrylate, 1,1,1-trihydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and divinyl benzene.

Examples of the combination of monomers each having a mutually reactive functional group and one or more radically polymerizable mono- or 1,1-di-substituted ethylenic unsaturation bonds are epoxy containing ethylenically unsaturated monomer (e.g. glycidyl acrylate, glycidyl methacrylate and the like) and carboxyl containing ethylenically unsaturated monomer (e.g. acrylic acid, methacrylic acid, crotonic acid and the like). Various combinations of reactive groups are proposed as, for example, amine and carbonyl, epoxy and carboxylic anhydride, amine and acid chloride, alkyleneimine and carbonyl, organoalkoxysilane and carboxyl, hydroxyl and isocyanate and the like, and they are satisfactorily used in the present invention.

As the mono-functional polymerizable monomer other than an aromatic compound, the following may be used.

(1) carboxyl group containing monomer as, for example, acrylic acid, methacrylic acid, crotonic acid, itaconic acid, maleic acid, fumaric acid and the like, (2) hydroxyl group containing monomer as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl acrylate or methacrylate as, for example, dimethyl aminoethyl acrylate, dimethyl aminoethyl methacrylate and the like, (4) polymerizable amide as, for example, acryl amide, methacryl amide and the like, (5) polymerizable nitrile as, for example, acrylonitrile, methacrylonitrile and the like, (6) alkyl acrylate or methacrylate as, for example, methyl acrylate, methyl methacrylate, ethyl acrylate, n-butyl acrylate, n-butyl methacrylate, 2-ethyl hexyl acrylate and the like, (7) polymerizable glycidyl compound as, for example, glycidyl acrylate, glycidyl methacrylate and the like, (8) α-olefin as, for example, ethylene, propylene and the like, (9) vinyl compound as, for example, vinyl acetate, vinyl propionate and the like,

(10) reaction compounds of the abovesaid monomers as, for example, reaction compound of hydroxyl containing monomer (2) with isocyanate compound, reaction compound of carboxyl containing monomer (1) with glycidyl containing compound and the like.

They may be used each singularly or in combination form. Examples of the monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, are addition product of maleic acid and glycidyl acrylate, addition product of maleic acid and glycidyl methacrylate, addition product of fumaric acid and glycidyl acrylate, addition product of fumaric acid add glycidyl methacrylate, addition product of maleic acid monoester and glycidyl acrylate, maleic acid monoester and glycidyl methacrylate, addition product of fumaric acid monoester and glycidyl acrylate, addition product of fumaric acid monoester and glycidyl methacrylate, addition product of substituted maleic acid and glycidyl (meth) acrylate, addition product of substituted maleic acid monoester and glycidyl (meth) acrylate, addition product of substituted fumaric acid and glycidyl (meth) acrylate, and addition product of substituted fumaric acid monoester and glycidyl (meth) acrylate.

The emulsion polymerization may be carried out in a conventional way, using a polymerization initiator and an appropriate emulsifier. Particularly preferable emulsifiers are acrylic, polyester, alkyd or epoxy resin having in its molecule an amphoionic group of the formula:

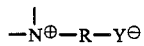

wherein R represents $C_1$ to $C_6$ alkylene or phenylene and $Y^\ominus$ *stands for* $-COO^\ominus$ or $-SO_3^\ominus$, *as disclosed in Japanese Patent Application Kokai No.* 129066/83.

In this first step of polymerization, only mono- or 1,1-di-substituted ethylenic bonds may participate in the reaction, giving crosslinked acrylic polymer particles still having unreacted 1,2-di-, 1,1,2-tri- or 1,1,2,2-tetra-substituted ethylenic unsaturation bonds on the surfaces thereof. 2. Preparation of the present composite acrylic resin particles each comprising a particulate crosslinked acrylic polymer to which a number of substantially linear acrylic polymer chains are chemically bonded: To thus obtained emulsion, a polymerizable aromatic compound is added and polymerization is continued to effect a graft polymerization between the remaining ethylenic unsaturation bonds and the polymerizable aromatic compound. Since 1,2-di-, 1,1,2-tri- and 1,1,2,2-tetra-substituted ethylenic bonds have a selective reactivity towards a polymerizable aromatic compound such as styrene, α-methyl styrene, vinyl toluene, t-butyl styrene and the like, a higher grafting rate can be attained with the aforesaid particulate crosslinked polymer coupled with the polymerizable aromatic compound. It is of course possible to use, besides the required polymerizable aromatic compound, other polymerizable monomers for the preparation of said linear polymer chains as desired. Any of the mono-functional polymerizable monomers hereinbefore stated under the column "preparation of core portion of crosslinked acrylic polymer" may satisfactorily be used. Furthermore, since a certain degree of branching or crosslinking is permissible according to circumstances, a limited amount of crosslinking monomer may be used together, as desired.

In any case, the shell portion of the present composite resin particles should be composed of substantially linear acrylic polymer and grafted to the crosslinked polymer core. Various desired properties may be given to the present composite resin particles by the selection of grafting monomers. For example, when the aforesaid monomers (1) or (3) are selected, the composite resin particles having carboxyl or amino containing polymer chains can be obtained, said particles having self-catalytic function in curing, high reactivity with an epoxy compound and being useful in an anionic or cationic electrodeposition use. When hydroxyl containing monomers are used, the resulted composite resin particles may be crosslinked with a melamine resin and/or isocyanate compound to give a tough coating. When the aforesaid monomers (4), addition products of hydroxyl containing monomers and monoisocyanate compounds or addition products of isocyanate containing monomers and monoamine compounds are used, it is possible to obtain the composite crosslinked resin particles with highly crystalline polymer chains which are useful in having structural viscosity and rheology control in a coating composition. It is also possible to carry on the linear polymer chains various functional groups and utilize the characteristic properties thereof. The present composite acrylic resin particles are excellent in dispersibilities in various solvents and resinous varnishes and possess self-film forming properties. Various functional polymers can be chemically bonded on the surface of the particulate crosslinked acrylic polymer. Therefore, the present composite acrylic resin particles are useful in various technical fields, including paint industries.

The invention shall be now more fully explained in the following Examples. Unless otherwise being stated, all parts and percentages are by weight.

REFERENCE EXAMPLE 1

Preparation of dispersion stabilizer

Into a 2 liter flask fitted with a stirrer, a nitrogen gas inlet tube, a thermoregulator, a condenser and a decanter, were placed 134 parts of bishydroxy ethyl taurine, 130 parts of neopentylglycol, 236 parts of azelaic acid, 186 parts of phthalic anhydride and 27 parts of xylene and the mixture was heated while removing the formed water azeotropically with xylene. The temperature was raised to 190° C. in about 2 hours from the commencement of reflux and the reaction was continued under stirring and dehydration until the acid value (based on carboxylic acid group) reached 145. Thereafter, the reaction mixture was allowed to cool to 140° C. and to this, 314 parts of Cardura E-10 (glycidyl versatate, trademark of Shell) were dropwise added in 30 minutes at 140° C. The mixture was stirred at the same temperature for 2 hours and then the reaction was stopped to obtain a polyester resin having an acid value of 59, a hydroxyl value of 90 and a number average molecular weight of 1054.

REFERENCE EXAMPLE 2

Preparation of dispersion stabilizer

Into a similar reaction vessel as used in Reference Example 1, were placed 73.5 parts of taurine Na salt, 100 parts of ethyleneglycol, and 200 parts of ethyleneglycol monomethyl ether, and the mixture was heated, under stirring, to 120° C. At the stage when a uniform solution was obtained, a mixture of 470 parts of Epicohto 1001 (bisphenol A diglycidyl ether type epoxy resin, epoxy equivalent 470, trademark of Shell Chem.) and 400 parts of ethyleneglycol monomethyl ether was dropwise added in 2 hours. After completion of said addition, the combined mixture was heated and stirred for 20 hours. Thus obtained product was then purified and dried to obtain 518 parts of modified epoxy resin, whose acid value (measured by KOH titration method) was 49.4 and sulfur content (measured by fluorescent X ray analysis) was 2.8%.

REFERENCE EXAMPLE 3

Preparation of dispersion stabilizer

Into a 1 liter flask fitted with a stirrer, a thermoregulator, dropping funnels, a nitrogen gas inlet tube and a condenser, were placed 140 parts of ethyleneglycol monomethyl ether and 140 parts of xylene, and the mixture was heated to 120° C. To this, a monomer mixture of 74 parts of methyl methacrylate, 70 parts of 2-ethylhexylacrylate, 24 parts of 2-hydroxyethyl methacrylate, and 12 parts of methacrylic acid, added with 5 parts of azobisisobutyronitrile and a solution of 20 parts of N-(3-sulfopropyl)-N-methacryloyloxyethyl-N,N-dimethyl ammonium betaine in 150 parts of ethyleneglycol monoethyl ether were simultaneously and dropwise added in 3 hours. After 30 minutes had elapsed from the completion of said addition, a solution of 0.4 part of t-butylperoxy-2-ethylhexanoate in 8 parts of ethylene glycol monomethyl ether was added and the combined mixture was kept at 120° C. for 1 hour and thereafter, the solvent was removed off to obtain an amphoionic group containing acrylic resin having a nonvolatile content of 92%.

REFERENCE EXAMPLE 4

Preparation of monomer containing two polymerizable ethylenic groups each having different co-reactivity Into a 1 liter flask fitted with a stirrer, an air inlet tube, a thermoregulator, and a condenser, were placed 430 parts of n-butyl maleate and 1.6 parts of hydroquinone and the mixture was heated to 150° C. To this, were dropwise added 373 parts of glycidyl methacrylate in 20 minutes and the combined mixture was maintained at 150° C. for 60 minutes. The reaction was stopped at the stage when the resinous acid value reached 3 KOH mg/g.

REFERENCE EXAMPLE 5

Preparation of monomer containing two polymerizable
ethylenic groups each having different co-reactivity Into a similar reaction vessel as used in Reference Example 4, 465 parts of n-butyl methyl maleate and 1.6 parts of hydroquinone were placed and the mixture was heated to 150° C. To this, were dropwise added 373 parts of glycidyl methacrylate in 20 minutes and the combined mixture was maintained at 150° C. for 60 minutes. After confirming the resinous acid value of less than 3 KOH mg/g, the reaction was stopped.

REFERENCE EXAMPLE 6

Preparation of monomer containing two polymerizable
ethylenic groups each having different co-reactivity Into a similar reaction vessel as used in Reference Example 4, were placed 500 parts of n-butyl dimethyl maleate and 2.0 parts of hydroquinone monomethyl ether and the mixture was heated to 150° C. Next, 373 parts of glycidyl methacrylate were dropwise added in 20 minutes and the combined mixture was maintained at the same temperature for 60 minutes. The reaction was stopped at the stage when the resinous acid value reached less than 30 KOH mg/g.

REFERENCE EXAMPLE 7

Preparation of polymerizable monomer Into a similar reaction vessel as used in Reference Example were placed 270.4 parts of phenyl isocyanate and 0.9 part of hydroquinone methyl ether and the mixture was heated to 60° C. To this, 286 parts of 2-hydroxyethyl methacrylate were dropwise added in 30 minutes and the combined mixture was maintained at 60° C. for 60 minutes. The reaction was stopped at the stage when the characteristic absorption of isocyanate group in IR spectrum had disappeared.

REFERENCE EXAMPLE 8

Preparation of polymerizable monomer

Into a similar reaction vessel as used in Reference Example 4, were placed 260 parts of 2-ethylhexylamine and 1.0 part of hydroquinone methyl ether and the mixture was heated to 60° C. To this, 310 parts of isocyanate ethyl methacrylate were dropwise added in 30 minutes and then the mixture was maintained at 60° C. for 90 minutes. The reaction was stopped at the stage when the characteristic absorption of isocyanate group in IR spectrum had disappeared.

EXAMPLE 1

Into a 1 liter flask fitted with a stirrer, a thermoregulator, a dropping funnel, a nitrogen gas inlet tube and a condenser, were placed 330 parts of deionized water and the temperature was raised to 80° C. Separately, a pre-emulsion was prepared by providing an aqueous dispersion stabilizer solution comprising 20 parts of the amphoionic group containing polyester resin obtained in Reference Example 1, 2 parts of dimethylethanolamine and 104 parts of deionized water, and gradually adding, while stirring in a Disper, a mixture of 64 parts of methyl methacrylate, 20 parts of n-butyl acrylate, 12 parts of monomer of Reference Example 4 and 64 parts of ethyleneglycol dimethacrylate thereto. An aqueous initiator solution was also prepared in a separate vessel, by mixing 2 parts of azobiscyanovaleric acid, 1.3 parts of dimethylethanolamine and 40 parts of deionized water. To the aforesaid reaction flask, the initiator solution and the pre-emulsion were dropwise added, in 80 minutes and 60 minutes, respectively. However, the addition of said pre-emulsion was started after 10 minutes had elapsed from the commencement of addition of said initiator solution. Then, the combined mixture was kept standing at 80° C. for 30 minutes, dropwise added with a mixture of 16 parts of styrene, 8 parts of n-butyl acrylate, and 16 parts of methyl methacrylate, and a solution of 0.8 part of azobiscyanovaleric acid, 0.6 part of dimethylethanolamine and 20 parts of deionized water in 20 minutes, and the combined mixture was kept at the same temperature for 1 hour. Thus obtained emulsion was subjected to a freeze-drying to obtain composite, crosslinked resin particles. The composite, crosslinked resin particles were easily dispersed in xylene, butyl acetate, methyl ethyl ketone, and ethyleneglycol monobutyl ether, respectively. Viscosities, grain diameters (determined by light scattering measurement) and grafting rate of these dispersions are shown in the following Table. The mean grain diameter of the resin particles in aqueous emulsion was 130 nm and the grafting rate was 92%.

TABLE 1

| Dispersing medium | viscosity (cp) | mean diameter (nm) |
|---|---|---|
| xylene | 250 | 165 |
| butyl acetate | 230 | 180 |
| methyl ethyl ketone | 220 | 180 |
| ethyleneglycol monobutyl ether | 260 | 190 |
| | (non-volatile content 30%) | |

The abovementioned organic solvent dispersions were applied on glass plates by using a doctor blade (20 mils), and dried to obtain clear coatings.

EXAMPLE 2

The same procedures as stated in Example 1 were repeated to obtain composite acrylic resin particles except substituting the polyester of Reference Example 2 for the polyester of Reference Example 1. Thus obtained composite resin particles were dispersed in xylene, butyl acetate and ethyleneglycol monobutyl ether, respectively and viscosity, mean grain diameter and grafting rate for each respective dispersion were measured.

The results are shown in Table 2. Incidentally, the mean grain diameter of said particles in an aqueous emulsion was found to be 110 nm.

TABLE 2

| dispersing medium | viscosity (cp) | mean diameter (nm) |
|---|---|---|
| xylene | 320 | 130 |
| butyl acetate | 280 | 160 |
| ethyleneglycol monobutyl ether | 360 | 180 |

(non-volatile content 30%)

The abovementioned organic solvent dispersions were applied by using a doctor blade (20 mils) and dried to obtain clear coatings.

EXAMPLES 3 TO 7

Using the dispersion stabilizer and polymerizable monomers shown in the following Table 3, the composite acrylic resin particles of the present invention were prepared as in Example 1. Their dispersion behaviors, mean grain diameters in xylene and butyl acetate and grafting rates are shown in Table 4.

COMPARATIVE EXAMPLES 1 TO 2

Similar pre-emulsions as stated in Example 1 were prepared with the monomers and dispersion stabilizer shown in Table 3. Then, the same procedures as used in Example 1 were repeated with said pre-emulsions and azobiscyanovaleric acid aqueous solution. However, in these Examples, the second step of graft polymerization had not been carried out and after completion of the addition of said pre-emulsion and azobiscyanovaleric acid solution, the combined mixture was reacted for 90 minutes. The characteristics of thus obtained emulsions are shown in Table 4.

COMPARATIVE EXAMPLE 3

The procedures of Example 1 were repeated with the materials shown in Table 3, except omitting the monomer of Reference Example 4. The amounts of respective materials used and the characteristics of the resulted product are shown in Table 3 and Table 4.

COMPARATIVE EXAMPLE 4

The procedures of Example 1 were repeated with the materials shown in Table 3, except substituting allyl methacrylate for the monomer of Reference Example 4. The amounts of respective materials used and the characteristics of the product are shown in Table 3 and Table 4.

In these Examples, the grafting rate was measured and calculated as follows:

A sample amount of composite resin particles are dispersed in a defined concentration in butyl acetate and the dispersion is centrifuged at 50,000 rpm for 120 minutes. The dissolved polymer weight and the precipitated particle weight are measured, and the grafting rate is calculated using the following equation:

$$G = \left(1 - \frac{NV}{NV_0 \times H}\right) \times 100$$

wherein G is grafting rate, NV is non-volatile content (%) of the supernatant separated, $NV_0$ is non-volatile content (%) of the dispersion not centrifuged, and H is the weight ratio of graft polymer to the total weight of the composite resin particle.

TABLE 3

|  | Example No. |  |  |  |  | Comp. Example No. |  |  |  |
|---|---|---|---|---|---|---|---|---|---|
|  | 3 | 4 | 5 | 6 | 7 | 1 | 2 | 3 | 4 |
| dispersion stabilizer |  |  |  |  |  |  |  |  |  |
| Ref. Example No. | 3 | 1 | 3 | 1 | 1 | 3 | 3 | 1 | 1 |
| weight parts | 30 | 24 | 50 | 36 | 20 | 30 | 30 | 20 | 20 |
| 1st stage monomers |  |  |  |  |  |  |  |  |  |
| methyl methacrylate | 82 | 30 | 56 | 48 | 4 | 95 | 60 | 64 | 64 |
| n-butyl acrylate | 60 | 46 | 32 | 25 | 8 | 75 | 60 | 20 | 20 |
| ethyleneglycol dimethacrylate | 24 | 64 |  |  |  |  | 30 | 80 | 64 | 64 |
| 1,6-hexanediol dimethacrylate |  |  | 42 | 20 | 30 |  |  |  |  |
| monomer of Ref. Ex. 4 | 14 |  |  | 7 | 18 |  |  |  |  |
| monomer of Ref. Ex. 5 |  | 20 |  |  |  |  |  |  |  |
| monomer of Ref. Ex. 6 |  |  | 10 |  |  |  |  |  |  |
| allyl methacrylate |  |  |  |  |  |  |  |  | 12 |
| 2nd stage monomers |  |  |  |  |  |  |  |  |  |
| styrene | 10 | 16 | 20 | 12 | 40 |  | 16 | 16 |  |
| n-butyl acrylate | 4 | 6 | 12 | 42 | 26 |  | 8 | 8 |  |
| methyl methacrylate |  | 6 | 14 | 25 | 45 |  | 16 | 16 |  |
| 2-hydroxyethyl methacrylate | 6 | 8 | 12 | 13 | 9 |  |  |  |  |
| methacrylic acid |  |  | 2 |  |  |  |  |  |  |
| dimethylaminopropyl methacrylamide | 4 |  |  |  |  |  |  |  |  |
| monomer of Ref. Ex. 7 |  |  |  | 8 |  |  |  |  |  |
| monomer of Ref. Ex. 8 |  |  |  |  | 20 |  |  |  |  |

TABLE 4

|  | Example No. |  |  |  |  | Comp. Example No. |  |  |  |
|---|---|---|---|---|---|---|---|---|---|
|  | 3 | 4 | 5 | 6 | 7 | 1 | 2 | 3 | 4 |
| mean diameter of aq. emulsion (nm) | 170 | 110 | 90 | 70 | 120 | 160 | 155 | 117 | 120 |
| dispersibility of composite particles in xylene | good | good | good | good | good | no good * | no good * | no good * | no good * |
| mean diameter in xylene (nm) | 220 | 130 | 125 | 110 | 160 | — | — | — | — |
| dispersibility of composite particles in butyl acetate | good | good | good | good | good | no good * | no good * | no good * | no good * |
| mean diameter in butyl acetate (nm) | 225 | 140 | 140 | 135 | 180 | — | — | — | — |

TABLE 4-continued

| | Example No. | | | | | Comp. Example No. | | | |
|---|---|---|---|---|---|---|---|---|---|
| | 3 | 4 | 5 | 6 | 7 | 1 | 2 | 3 | 4 |
| grafting rate (%) | 91 | 90 | 87 | 82 | 80 | — | — | 38 | 58 |
| appearance of dried film | clear | clear | clear | clear | clear | coagulation brittle coating | no film-forming powdery film | coagulation translucent | coagulation clear |

*containing coarse grains

What is claimed is:

1. Composite acrylic resin particles each comprising a particulate crosslinked acrylic polymer to which a number of substantially linear acrylic polymer chains are chemically bonded prepared by a combination of steps which comprise effecting an emulsion polymerization of a monomer mixture of
   (A) at least one crosslinking monomer having in its molecule two or more radically polymerizable mono- or 1,1-di-substituted ethylenic unsaturation bonds, or a combination of at least two monomers each having a mutually reactive functional group and one or more radically polymerizable mono- or 1,1-di-substituted ethylenic unsaturation bonds,
   (B) at least one mono-functional polymerizable monomer other that an aromatic compound, and
   (C) at least one monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, to obtain an emulsion of crosslinked polymer particles on which radically polymerizable 1,2-di-, 1,1,2-tri- or 1,1,2,2-tetra-substituted ethylenic unsaturation bonds still remain, and effecting graft-polymerization of said polymer particles with a polymerizable aromatic compound.

2. The particles according to claim 1, wherein the crosslinking monomer having in its molecule two or more radically polymerizable mono- or 1,1-di-substituted ethylenic unsaturation bonds is selected from the group consisting of a polymerizable unsaturated monocarboxylic acid ester of a polyhydric alcohol, a polymerizable unsaturated alcohol ester of a polycarboxylic acid and an aromatic compound substituted with two or more vinyl groups.

3. The particles according to claim 1, wherein the combination of two monomers each having a mutually reactive functional group and one or more radically polymerizable mono- or 1,1-di-substituted ethylenic unsaturation bonds are the two monomers each having a mutually reactive functional group and one or more acryloyl, methacryloyl or crotonoyl group.

4. The particles according to claim 3, wherein the mutually reactive functional group is expoxy group to carboxyl group, amine group to carbonyl group, epoxy group to acid anhydride, amine group to acid chloride, alkylene imine group to carbonyl, organo-alkoxy silane carboxyl, and hydroxyl group to isocyanate group.

5. The particles according to claim 1, wherein the monomer having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds is an addition product of maleic or fumaric acid and glycidyl (meth) acrylate, an addition product of maleic or fumaric acid monoester and glycidyl (meth) acrylate, an addition product of substituted maleic or fumaric acid and glycidyl (meth) acrylate, or an addition product of substituted maleic or fumaric acid monoester and glycidyl (meth) acrylate.

6. Composite acrylic resin particles each comprising a particulate crosslinked acrylic polymer to which a number of substantially linear acrylic polymer chains are chemically bonded, prepared by a combination of steps which comprise:
effecting an emulsion polymerization of a monomer mixture of
   (A) at least one crosslinking monomer having in its molecule two or more radically polymerizable 1,1-di-substituted ethylenically unsaturated bonds,
   (B) at least one of alkyl acrylate and methacrylate, and
   (C) at least one monomer having in its molecule one or more radically polymerizable 1,1-di-substituted ethylenically unsaturated bonds and one or more radically polymerizable 1,2-di-substituted ethylenically unsaturated bonds,
to obtain an emulsion of crosslinked polymer particles on which radically polymerizable 1,2-di-substituted ethylenically unsaturated bonds still remain, and
effecting graft-polymerization of said polymer particles with a styrene compound, optionally together with at least one of an alkyl acrylate and an alkyl methacrylate.

7. The particles according to claim 1, wherein the graft-polymerization of said polymer particles is effected with a polymerizable aromatic compound together with a mono-functional polymerizable monomer which is other than the aromatic compound.

* * * * *